Figure 1:
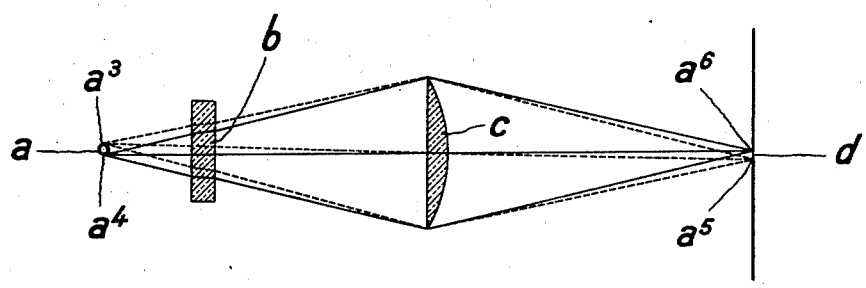

May 13, 1930.   A. KÖHLER   1,758,049
ILLUMINATING DEVICE
Filed June 21, 1929

Inventor:
August Köhler.

Patented May 13, 1930

1,758,049

UNITED STATES PATENT OFFICE

AUGUST KÖHLER, OF JENA, GERMANY, ASSIGNOR TO THE FIRM OF CARL ZEISS, OF JENA, GERMANY

ILLUMINATING DEVICE

Application filed June 21, 1929, Serial No. 372,641, and in Germany June 23, 1928.

When making physical experiments it frequently is necessary to have a long and narrow field illuminated as intensely and uniformly as possible. In order to render this feasible it has been tried to image an illuminated diaphragm with a slit of corresponding dimensions or a filiform source of light on the plane of the field by means of an optic system, for which purpose the longitudinal dimension of the source of light was made approximately perpendicular to the path of the illuminating rays. With an illumination of this kind the uniformity of the intrinsic brilliancy is strongly dependent on the depth of the source of light and, therefore, from the very beginning sources of light with comparatively great depths are not suitable. Of late, however, in many cases only incandescent lamps with spiral filaments are at disposal as sources of light, which means that, when applying them for the purpose referred to here, one has to renounce the sharp imaging of the source of light and the sharp limitation of the field, which would impair the intrinsic brilliancy.

The invention consists of a device that allows a sufficiently uniform and bright field of illumination of which the two long sides are sharply bounded, also when employing a source of light that is spatial in the said sense. According to the invention this aim is attained by giving the source of light, whose longitudinal axis is made to be approximately perpendicular to the path of the illuminating rays, such a position to a cylindrical and a spherical system with collective effect, which two systems are employed at the same time, that the spherical system images for itself the source of light approximately in the plane of the field and the cylindrical one has the source of light projected in the main section perpendicular to the axis of the cylinder, and this approximately in the entrance pupil of the spherical system, whereby the axis of the cylinder perpendicularly intersects the longitudinal axis of the source of light. By interposing the cylindric system the image of the source of light projected by the spherical system alone, is but slightly displaced in the plane of the main section parallel to the axis of the cylinder, whereas in the main section plane perpendicular thereto all points of the source of light are imaged as lines that cover each other, which means that the structure of the source of light will not show in its image. The long sides of the illuminated field are sharp when the arrangement is provided in such a manner that by using the cylindrical system the image of the source of light is displaced just in the plane of the main section parallel to the axis of the cylinder.

In order to have with a given source of light an intrinsic brilliancy as intense as possible of the illuminated field, it is advisable to let the cylindrical system have a size allowing the lines connecting any points of the source of light with any on the edge of the entrance pupil to intersect all refracting surfaces of the cylindric system and, further, the image of the source of light, which is produced of this system in the main section perpendicularly to the axis of the cylinder, have a size that at least is equal to the diameter of the entrance pupil of the spherical system. Consequently, the image of the source of light, which is projected approximately on the plane of the entrance pupil of the spherical system, must amply cover the diameter of the entrance pupil and, moreover, the diameter of the cylindrical lens in the main section parallel to the axis of the cylinder must have a size which will not allow its edges to shade off the said entrance pupil for an examiner looking in from the source of light. The breadth of the illuminated slit-shaped field, i. e. the length of its short sides, will be then approximately equal to the breadth of the image of the source of light produced by the sphercial system alone. The intrinsic brilliancy of the field is uniform over a big part of the length of the field and diminishes only towards the two ends, because there the linear images of the radiant points no longer cover each other in their total lengths. The available length of the field, i. e. the part without noticeable decrease of intensity, is dependent on size and position of the image projected by the spherical system from the effective aperture of the cylindrical system.

Figure 2:
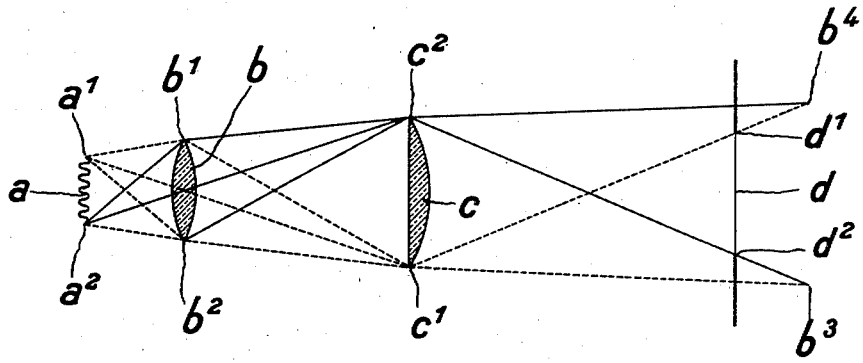

The drawing schematically represents a simple constructional example of the invention. Fig. 1 shows the main section plane, parallel to the axis of the cylinder, Fig. 2 the central section in the main section plane, perpendicular thereto.

In the example given in the drawing there is supposed to serve as source of light a spiral-filament lamp whose filament is denominated $a$. In the section represented by Fig. 2 the ends $a^1$ and $a^2$ of this incandescent filament $a$ are imaged by a collective cylindrical lens $b$ on the edge of a spherical collective lens $c$, viz. on the points $c^1$ and $c^2$. The collective lens $c$ images the ends of the diameter $b^1$ $b^2$ of the cylindrical lens $b$, which is in the section plane, on points $b^3$ and $b^4$. The field to be illuminated, whose plane is arranged perpendicularly to the plane of the drawing, is denominated $d$. The focal length and the position of the converging lens $c$ are chosen in such a way that the diameter $a^3$ $a^4$ of the source of light $a$, which is in the plane of Fig. 1, is imaged in this section and near the plane of the field $d$ alone by the lens $c$, and that, owing to the interposition of the lens $b$, the said image is displaced to such an extent that it will just fall on the plane of the field $d$. The image the lenses $b$ and $c$ project of the diameter $a^3$ $a^4$ of the source of light $a$ on the section represented in Fig. 1 is denominated $a^5$ $a^6$; it determines the breadth of the illuminated field $d$. The length $d^1$ $d^2$ of the illuminated field $d$ results to be on the section of Fig. 2 that district where the pencils of imaging rays emanating from the different points of the source of light $a$ cover each other. When the cylindric lens $b$ is given an adequate focal length, the image points $b^3$ and $b^4$ will fall on the plane of the field $d$, and then the illuminated field is sharply bounded also on its short sides. The diameter of the cylindric lens $b$ is given in the section of Fig. 1 a size that allows the connecting lines of any points of the source of light $a$ with the edge of the lens $c$ to intersect both refracting surfaces of the said cylindric lens $b$, and as a consequence the lens $c$ is not shaded off by the lens $b$ for an examiner looking in from the source of light $a$.

I claim:

1. A device for approximately uniform illumination of a slit-shaped field, containing an oblong spatial source of light, whose longitudinal axis is perpendicular to the axis of the device, a cylindrical system of collective effect, whose cylindrical axis is perpendicular to the longitudinal axis of the source of light, and a spherical system of collective effect disposed behind the cylindrical system, the cylindrical system being adapted to project in the main section perpendicular to its cylinder axis, approximately in the entrance pupil of the spherical system, an image of the source of light, and the spherical system being adapted to alone project an image of the source of light approximately in the plane of the field to be illuminated.

2. A device for approximately uniform illumination of a slit-shaped field, containing an oblong spatial source of light, whose longitudinal axis is perpendicular to the axis of the device, a cylindrical system of collective effect, whose cylindrical axis is perpendicular to the longitudinal axis of the source of light, and a spherical system of collective effect disposed behind the cylindrical system, the cylindrical system, having a diameter allowing the passage of all those rays which are emanated from any point of the source of light to any point of the periphery of the entrance pupil of the spherical system, and being adapted to project in the main section perpendicular to its cylinder axis, approximately in the entrance pupil of the spherical system, an image of the source of light, which is at least as long as the diameter of the said entrance pupil, and the spherical system being adapted to alone project an image of the source of light approximately in the plane of the field to be illuminated.

AUGUST KÖHLER.